United States Patent [19]
Kataoka

[11] 3,835,377
[45] Sept. 10, 1974

[54] THREE TERMINAL MAGNETORESISTIVE MAGNETIC FIELD DETECTOR IN WHICH VOLTAGES OF OPPOSITE POLARITY RELATIVE TO GROUND ARE APPLIED TO OPPOSITE ENDS

[75] Inventor: Shoei Kataoka, Tokyo, Japan

[73] Assignee: Kogyo Gijutsuin, a/k/a, Agency of Industrial Science and Technology, Ministry of International Trade and Industry, Japanese Government, Tokyo-To, Japan

[22] Filed: Mar. 28, 1973

[21] Appl. No.: 345,576

Related U.S. Application Data

[63] Continuation of Ser. No. 121,914, March 8, 1971, abandoned.

[30] Foreign Application Priority Data

Mar. 9, 1970 Japan.............................. 45-19270

[52] U.S. Cl................ 324/46, 307/309, 323/94 H, 338/32 R
[51] Int. Cl........................................... G01r 33/06
[58] Field of Search .... 324/45, 46; 338/32 R, 32 H; 323/94 H; 307/309

[56] References Cited
UNITED STATES PATENTS

| | | |
|---|---|---|
| 3,267,404 | 8/1966 | Hieronymus..................... 338/32 H |
| 3,286,161 | 11/1966 | Jones et al........................ 338/32 H |
| 3,335,384 | 8/1967 | Weiss................................. 338/32 R |

FOREIGN PATENTS OR APPLICATIONS

| | | |
|---|---|---|
| 1,290,341 | 3/1969 | Germany...................... 324/34 PS |
| 1,069,755 | 11/1959 | Germany........................ 338/32 H |

Primary Examiner—Robert J. Corcoran
Attorney, Agent, or Firm—Robert E. Burns; Emmanuel J. Lobato; Bruce L. Adams

[57] ABSTRACT

Disclosed herein is a detector of local magnetic field, in which metallic electrodes are connected to the both ends and central part of at least one semiconductor having a magneto resistive characteristic thereby to form at least one magneto resistive element having three terminals, said element being arranged on a plane, whereby presence of a local magnetic field in said element can be detected from a voltage appearing across each of the central electrodes of said elements and a predetermined reference point.

In addition, a semiconductor displacement transducer is also disclosed, which serves to produce an output voltage having any of the polarity, positive or negative, corresponding to a magnetic field displacement, by displacing the magnetic field applied to a part of the magnetoc resistive element with three terminals.

8 Claims, 20 Drawing Figures

THREE TERMINAL MAGNETORESISTIVE MAGNETIC FIELD DETECTOR IN WHICH VOLTAGES OF OPPOSITE POLARITY RELATIVE TO GROUND ARE APPLIED TO OPPOSITE ENDS

This is a continuation, of application Ser. No. 121,914, filed Mar. 8, 1971 and now abandoned.

BACKGROUND OF THE INVENTION

The present invention relates to a detector of local magnetic field, for example, the locally varied location of a magnetic field such as found in a magnetic domain in ortho-ferrite and to an other semiconductor displacement transducer.

Heretofore, there have been a Hall element and a magneto resistive element as a semiconductor which is sensible to a magnetic field. The Hall element is an element with four terminals, which comprises a pair of electrodes to let an electrical current flow to a semiconductor body and another pair of electrodes to obtain a Hall voltage due to a magnetic field. On the other hand, a magneto resistive element has a simple construction in which electrodes are connected to both ends of the semiconductor body, and is intended to utilize the variation of the resistance between both electrodes due to the magnetic field.

Figure 2:
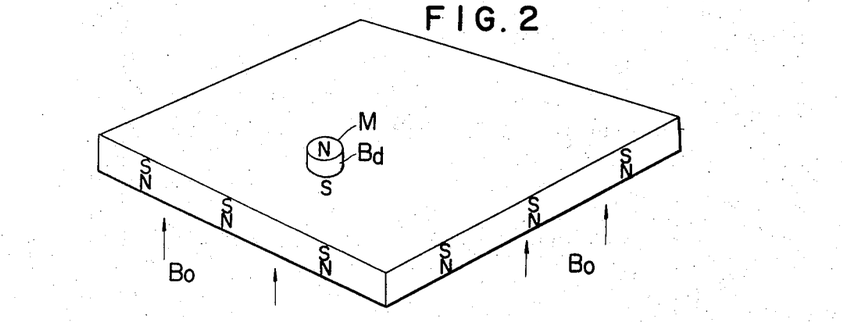
FIG. 2 is an diagram explaining at least one magnetic domain.

Recently, it has been found that a magnetic domain M the polarity of which is locally reversed under the condition that a certain bias magnetic field Bo is applied as shown in FIG. 2 appears in a certain type of magnetic material such as orthoferrite, and the material has the possibility to store information therein by displacing the position of the magnetic domain in the magnetic material. However, in detecting the position of the magnetic domain M, a considerably large device detecting the reflection resulted from a deflecting light applied thereto has been used and there has been no possibility to practically employ an electronic device for this purpose. Although it has been also suggested to detect the position of the magnetic domain by utilizing a Hall element of a semiconductor, it is necessary to provide four terminals for the Hall element. Accordingly, if a number of Hall elements are arranged on a two-dimensional plane, the circuit becomes very complicated. As a result, the Hall element are not practical in use.

Furthermore, mechanical switches, such as a rotary switch, a slide switch provided with mechanical contacts, do not always make a good contact with each other and often produce much noises. Therefore, mechanical switches have disadvantages that they are low in both reliability and accuracy.

In order to eliminate such drawbacks as mentioned above, a potentiometer which employs the magneto resistance effect of a semiconductor has been proposed. However, such a potentiometer is not suitable for practical use due to its poor efficiency, though it is of a non-contact type. Moreover, the potentiometer has drawbacks that the signal ratio is small when an electrical signal is generated by utilizing the displacement of the magnetic field thereby to carry out switching action, and is not convenient in use.

SUMMARY OF THE INVENTION

It is accordingly a primary object of the present invention to provide a detector of local magnetic field which detects any position of a local magnetic domain on a two dimentional plane with outstanding readiness and efficiency by utilizing the characteristic of a magneto resistive element having three terminals, wherein all of the above drawbacks of the conventional device can be eliminated.

Another object of the invention is to provide a detector of local magnetic field which detects any position of a local magnetic domain and is very useful in the information process technique utilizing the magnetic domain.

A further object of the invention is to provide a detector of local magnetic field which detects any position of a local magnetic domain by utilizing the magneto resistance effect, in which output terminals whose number is a half of the number of positions to be detected are used, and the presence or absence and the polarity of the output voltage are readily discriminated.

A still further object of the invention is to provide a method of detecting the position of a local magnetic domain on a two-dimensional plane with outstanding readiness and efficiency by utilizing the characteristic of a magneto resistive element having three terminals.

A specific object of the invention is to provide a semiconductor displacement digital signal generator which can generate output voltages which have various types of relationships and which are correspondent to the displacement of at least one magnetic field applied to the group of three-terminal magneto resistive elements.

A more specific object of the invention is to provide a semiconductor displacement digital signal generator, in which positive and negative voltages in a desired combination can be generated by displacement of at least one discrete magnetic field, whereby the generator can be utilized for a rotary switch or a multi-pole selective switch in combination of at least one switching transistor.

A particular object of the present invention is to provide an excellent semiconductor displacement digital signal generator which is outstandingly high in reliability and compactness, and permanent in service life and which does not cause any noise and wear, in which an electrical circuit system is realized without mechanical contact parts.

A more particular object of the invention is to provide a semiconductor displacement digital signal generator which can be applied to a general electronic device such as a television set, a stereophonic set, and the like, and to a complicated switch for a computer and the like.

The foregoing objects and other objects as well as the characteristic features of the invention will be more apparent from the following detailed description and the appended claims when read in conjunction with the accompanying drawings, in which like parts are designated by like reference numerals.

DETAILED DESCRIPTION OF THE INVENTION

Figures 1, 6:
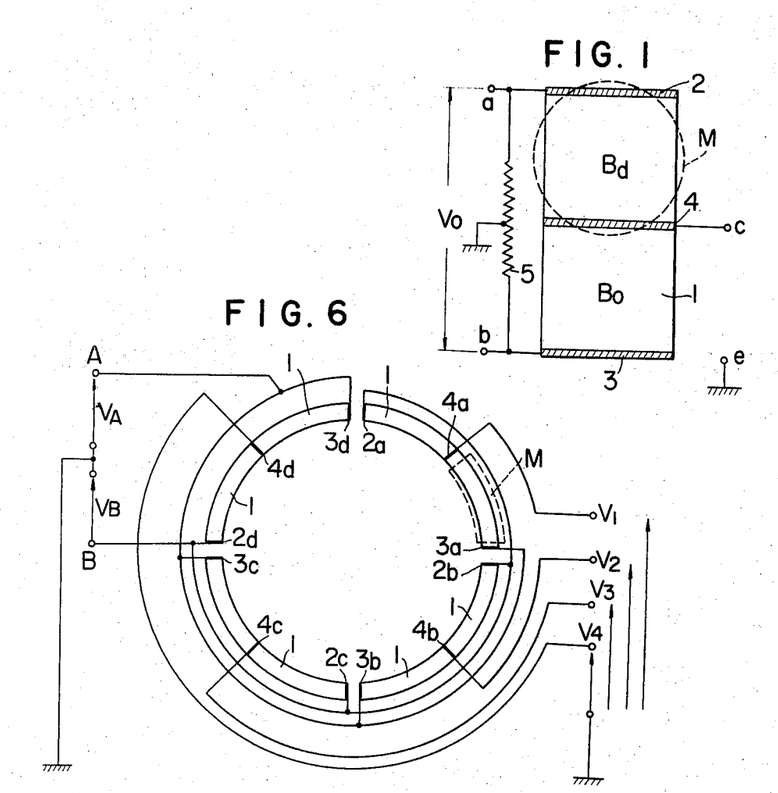
FIG. 1 is an explanatory diagram illustrating the principle of a magneto resistive element having three terminals.
FIG. 6 through FIG. 13 explains various and different embodiments of the present invention.

With reference now to FIG. 1, shown is the fundamental operational principle of a magneto resistive element with three terminals. Metallic electrodes 2, 3, and 4 are connected to both ends of a semiconductor body 1 having a magneto resistive characteristic and to a central part thereof, respectively. Both end electrodes 2 and 3 are provided with terminals a and b, and a central electrode 4 with a terminal c. A voltage Vo is applied across the both end terminals, and an intermediate potential therebetween is grounded to be zero by way of connecting a high resistor 5 between terminals a and b and then grounding the middle point of the resistor. In this case, the high resistor 5 can be substituted for suitable electric cells or A.C. impedances to attain the same operation as that in the high resistor described above. When no magnetic field is applied to this semiconductor body or a uniform magnetic field is applied to it, the circuit can be made so that no voltage appears between the central terminal c and the ground e.

Now, if it is assumed that there is a local magnetic field M only in an upper half of the magneto resistive element, that is, in a part correspondent to a part between the electrodes 2 and 4, a resistance value $R_{24}$ between the electrodes 2 and 4 becomes different from a resistance value $R_{43}$ between the electrodes 4 and 3, and consequently a certain voltage V is generated between the terminal c and the ground e. However, if the local magnetic field M moves over to the lower half part of this element, that is, to the part between the electrodes 3 and 4, a voltage appearing between the terminal c and the ground e becomes, in general, $-V$.

In other words, the presence and absence of a local magnetic field and their two positions (if it is either in the upper half part or in the lower half part) can be known by a voltage appearing at one terminal c extended from the central electrode, if such a magneto resistive element with three terminals is utilized. In this case, such a element with three terminals can be substituted for two magneto resistive elements with two terminals which are connected in series with each other. According to the invention, in order to detect any varied position of local magnetic fields, any of the following methods can be utilized. One is a method wherein an uniform magnetic field is applied to a magneto resistive element, then after a part of the field is varied, and the other is a method wherein only a local magnetic field is applied thereto. Therefore, the invention can be utilized to detect a position of each of magnetic bubble domains.

In general, a resistance of a semiconductor varies sensitively with variation of a temperature. However, in the arrangement according to the present invention, its operation is carried out by the resistance ratio of the same semiconductor, as a result of which the temperature dependability of the resistance is counteracted whereby a stable operation is carried out. This is one of the advantages of the present invention.

Figure 3A:
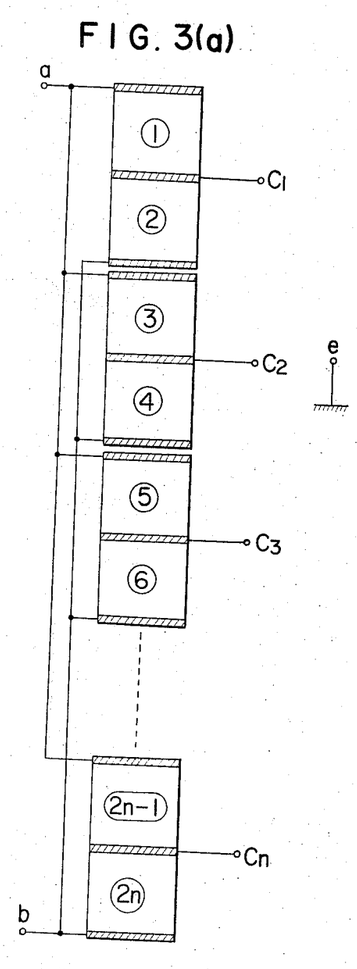
FIGS. 3a and 3b are explanatory diagrams illustrating the principle of detecting the position of at least one magnetic domain on a straight line.
Figure 3B:
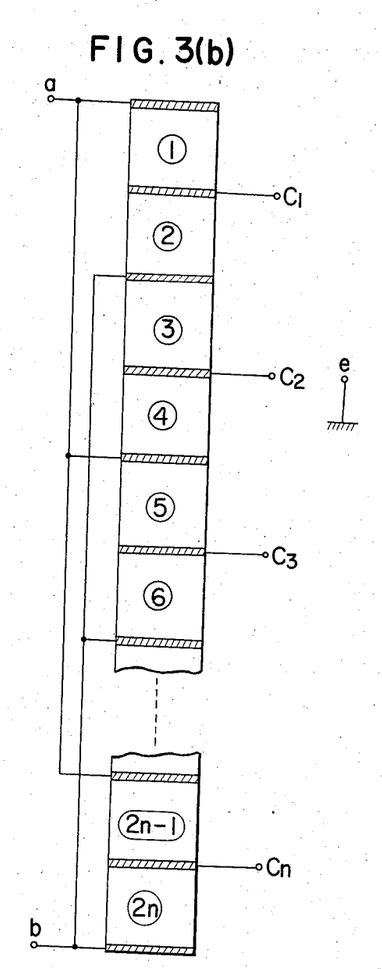

Therefore, with a unidimentional example as seen in FIG. 3a, wherein such three-terminal magneto resistive elements whose number is n are straightly arranged, all the upper end terminals are connected together in parallel, while, in the same way, all the lower end terminals are connected together in parallel; when a certain voltage is applied across two combination terminals a and b and the intermediate point between terminals a and b is grounded, one can find out where the magnetic domain to be detected is located among positions from 1 to 2n by detecting voltages between each of n terminals $c_1, c_2, c_3$ through $c_n$ and the ground. Moreover, in a simple method also, as shown in FIG. 3(b), where a number of electrodes are connected to one long solid semiconductor body 1 and those electrodes are alternatively connected in the order named as terminals $a, c_1, b, c_2, a, c_3, b$ and so on, instead of individually arranging the three-terminal magneto resistive elements; the position from 1 to 2n of at least one magnetic domain can be detected from only n terminals $c_1$ through $c_n$.

Figure 4:
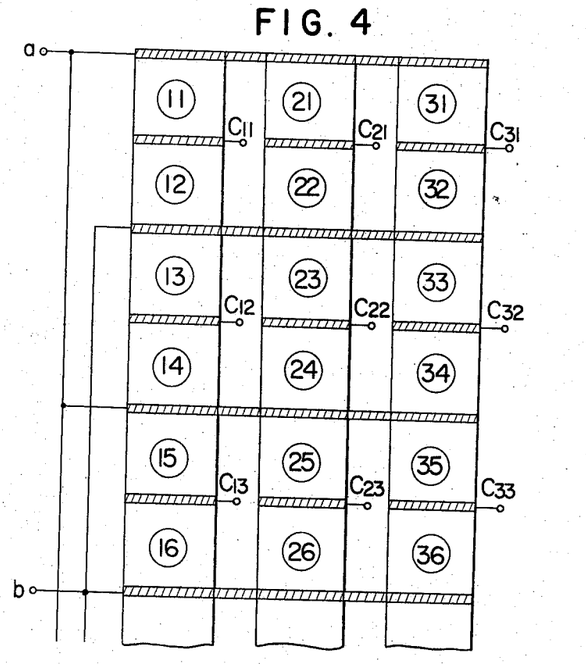
FIG. 4 is an explanatory diagram illustrating the principle of detecting the position of at least one magnetic domain on a plane.

The Table 1 shows the relationships between the position of a magnetic domain and a voltage at its respective terminal in the two methods (a) and (b):

Referring now to FIG. 4, there is shown an embodiment developing the principle described above on a two dimensional plane. All the end terminals of parts correspondent to three-terminal magneto resistive elements are commonly connected together at each line, respectively and, an output terminal Cij is extended from each of the central electrodes thereof. Reference symbol Cij represents an output terminal which is located on i column and j line. Accordingly, if it is assumed that the whole arrangement is composed by n columns and m lines, the position of at least one magnetic domain which is positioned in two-dimensional space can be detected by measuring voltages between each of $n \times m$ terminals and the ground. Of course, it is no troublesome for this arrangement whether there is present one or more magnetic domains. If there is no magnetic domain present, no voltage appears at any of terminals.

Figure 5:
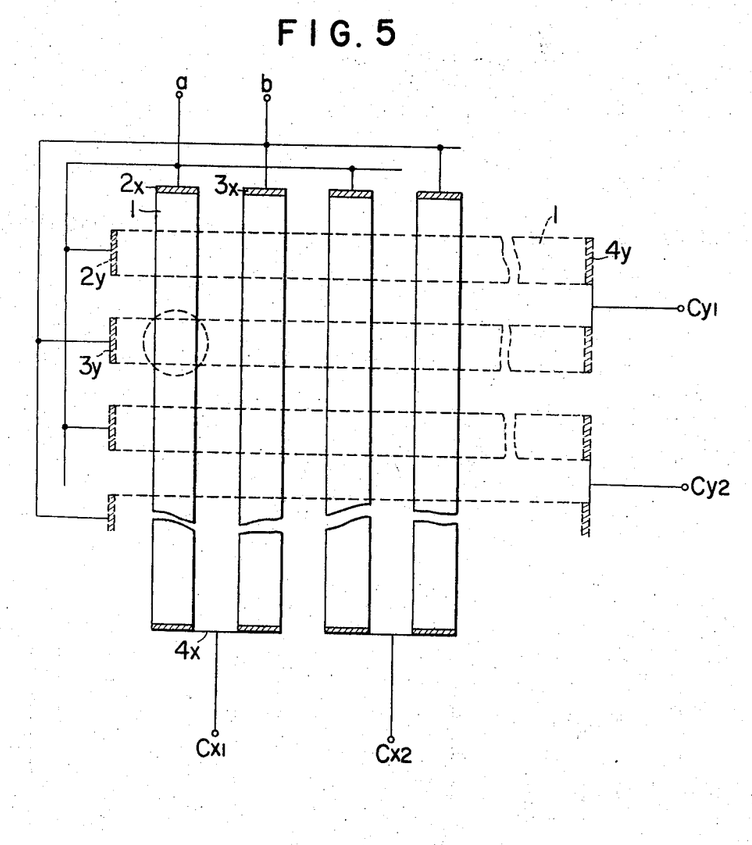
FIG. 5 is an explanatory diagram illustrating an example of detecting the position of at least one magnetic bubble domain on a plane.

FIG. 5 illustrates an example of detecting the position of at least one magnetic bubble domain on a plane. According to the example of FIG. 5, a magnetic field does not necessary be applied to the whole area between both end electrodes 2x and 3x of the semiconductor body 1, and if only the magnetic field is applied to a part thereof, the variation of resistance corresponding to the applied magnetic field can be produced. Therefore, assuming that a plurality of magneto resistive elements are, as shown in FIG. 5, arranged in the form of the lines and rows, presence and absence of a magnetic domain in the lines and rows can be detected by the variation of the resistance.

For example, when a magnetic domain is in the first line of the elements, a voltage appearing across the terminal $C_{x1}$ and the reference point becomes positive, and when it is in the second line thoseof, it becomes negative. Accordingly, it is evident that if the magnetic domain is neither in the first line or in the second line of the elements, the voltage described above is zero. Thus, it is possible to detect presence and absence of at least one magnetic domain by arranging a plurality of elongated magneto resistive elements in the form of the lines and rows. Still, assuming that number of a position of magnetic domain to be detected is n, the number of the necessitated output terminals comes to $\sqrt{n}/2$, so that the circuit of the example as shown in FIG. 5 becomes very simple in organization.

It is known that the magnetic domain can be made to the size of approximately 1 to 10 μm; however in the arrangement according to the present invention it is possible to have a resolution power the magnitude of which is on the same order as that of the magnetic domain, by utilization of an integrated circuit technique, since the device is very simple in construction.

Another embodiment according to the present invention will be hereinafter explained in detail.

Shown in FIG. 6 is an embodiment in which the above-mentioned principle is applied to a rotary switch. Four magneto resistive elements each of which has three terminals illustrated in FIG. 1 are circularly arranged, and input electrodes are connected in parallel. By rotating a magnetic field M which is a half ($\pi/4$ radian) of one element in size, voltages $V_1$, $V_2$, $V_3$ and $V_4$ appearing at the output electrodes, each of which is located shown the middle part of a respective element, vary as shwon in Table 2. In this table, the position of the magnetic field is expressed by a clockwise revolution angle (radian) of the center position of a magnetic field from a center position (zero position) between electrodes $2a$ and $3d$. An output voltage having a positive polarity means that it has the same polarity as that of an input voltage, while an output voltage having a negative polarity means that it has the opposite polarity to that of the input voltage. In the case that four magnetic fields each of which is $\pi/4$ radian in magnitude are provided at an interval of $\pi/4$ radian in the same arrangement, a series of outputs shown in Table 3 can be obtained by a clockwise or counterclockwise revolution of the magnetic field system. Furthermore, in the case that only the magnitude of a magnetic field is made $\pi/2$ radian and one magnetic field is rotated, outputs shown in Table 4 are obtained, while in the case that two magnetic fields which are $\pi/2$ radian in magnitude are symmetrically opposed to each other, outputs in combination shown in Table 5 can be obtained.

Figure 7:
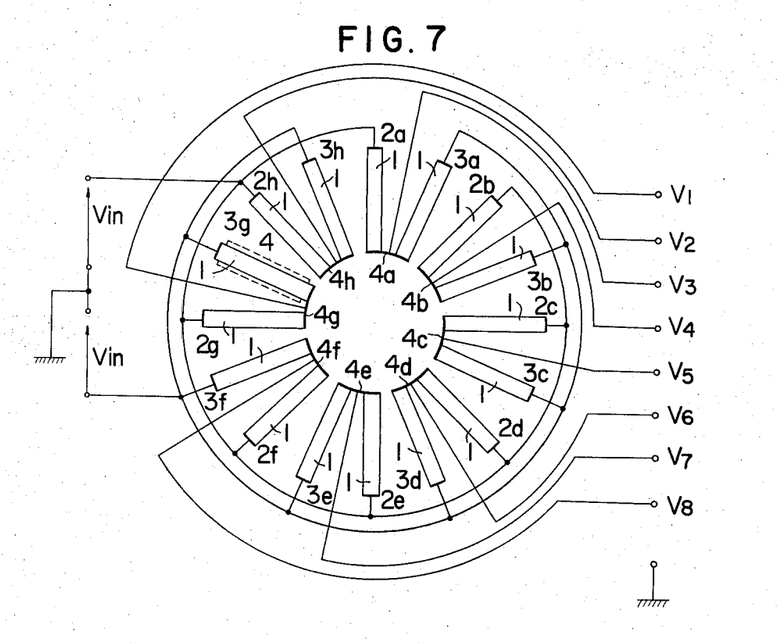

An embodiment illustrated in FIG. 7 is the same as that in FIG. 6 in principle, but has a construction in which each of a magneto resistive elements with three terminals is folded at a position of the central electrode so as to make a forked shape each leg of which is opened radially. However, a number of combinations each of which comprises pairs of two-terminal magneto resistive elements electrically connected by an electrode 4, are circularly arranged in a practical use, and output voltages $V_1$, $V_2$, $V_3$, $V_4$, $V_5$, $V_6$, $V_7$ and $V_8$ appearing at the output electrodes each of which is located at the central part of its own elements vary, as corresponded to Table 2, by the rotary movement of a magnetic field M whose effective area is such that the magnetic field is applied only to one magneto resistive element.

Figure 8A:
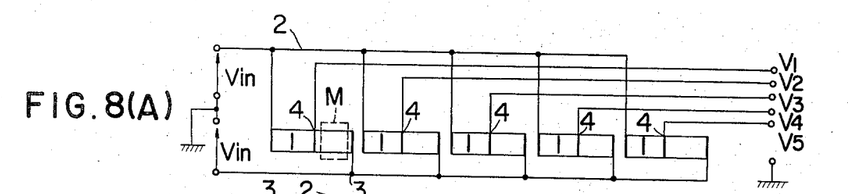
Figure 8B:
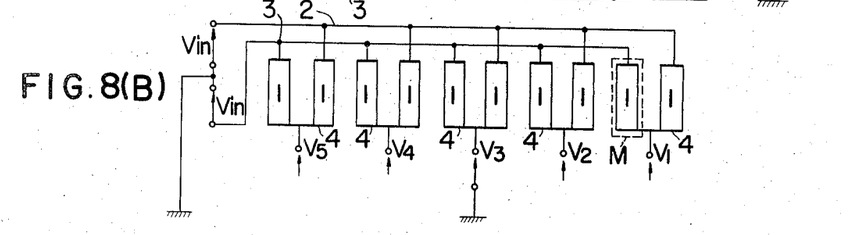

In embodiments shown in FIG. 8(A) and FIG. 8(B), magneto resistive elements illustrated in FIG. 6 and FIG. 7 are arranged linearly instead of circularly, respectively. In this case, outputs having the same relationships shown in Table 3 are obtained by linear movement of a magnetic field M the effective area of which is substantially equal to that of the element between the input electrode 2 and the output electrode 4, as a result of which the embodiment can be utilized for a selective switch of a linear movement type.

In addition, in a linear type device, a snap type operation can be carried out in the same way as in the rotary type device, by combining some magnetic fields together.

Figure 9A:
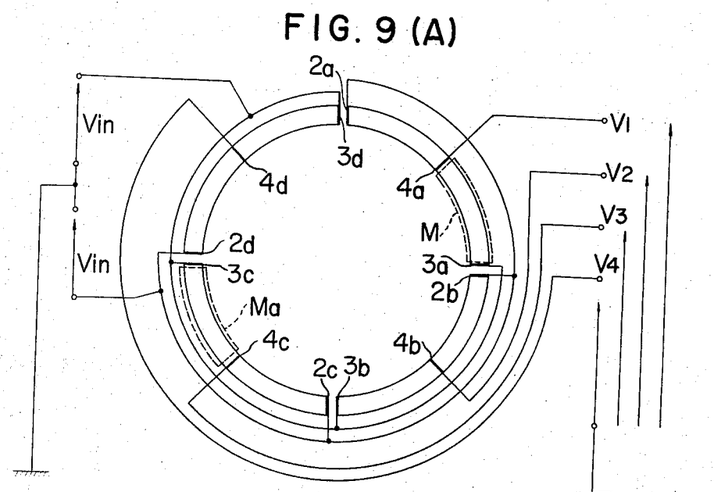

An example illustrated in FIG. 9(A) is of a rotary type, in which for magneto resistive elements are arranged circularly. Two magnetic fields having $\pi/4$ radian in magnitude, are symmetrically arranged so that they are opposed to the center of the circle, and both magnetic fields are rotated simultaneously.

Figure 9B:
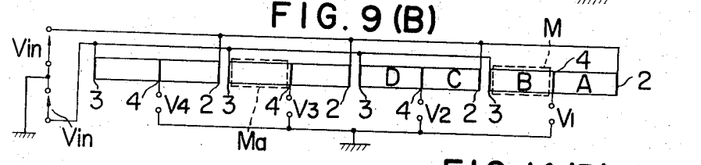

In an embodiment shown in FIG. 9(B), such a device is disclosed that four magneto resistive elements with three terminals are arranged in linear, and two magnetic fields are displaced simultaneously so as to be applied to only half part of the alternate elements. The outputs therefrom are generated with the relationships indicated in Table 6.

Figure 10:
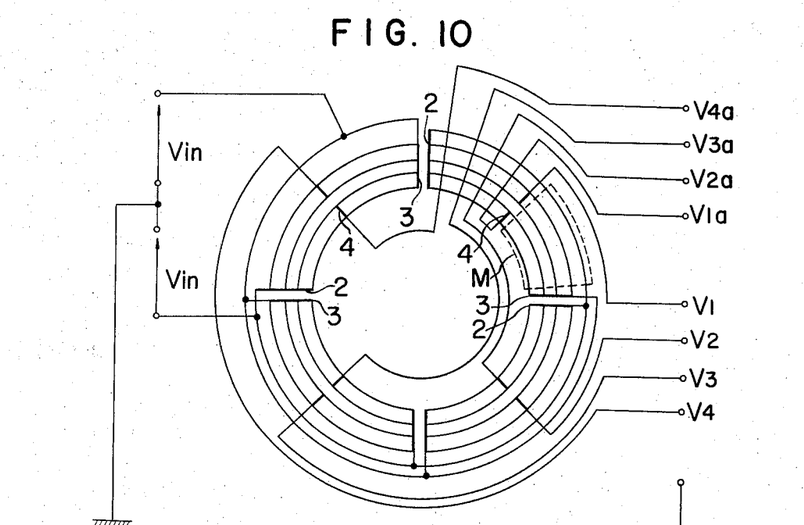

In an embodiment shown in FIG. 10, the constructions of the magneto resistive elements illustrated in FIG. 6 are doubly arranged and a common magnetic field are applied to the constructions thus doubly arranged. In this case, the outputs having the relationship shown in Table 7 are generated.

Figure 12:
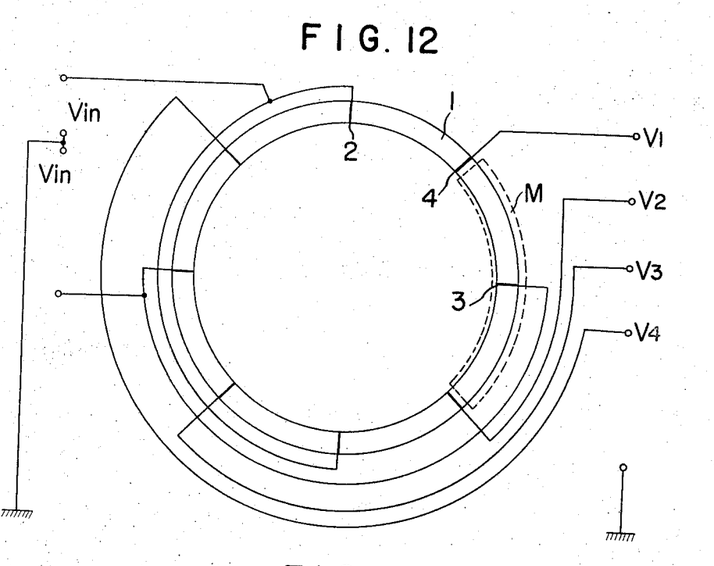

In the above description, the case where a number of the magneto resistive elements each of which has three terminals are arranged circularly, have been explained. However, in an example shown in FIG. 12, metallic electrodes are provided at a certain interval for annular semiconductors which show a magneto resistive characteristic, and the same effect as obtained in the above embodiments can be attained by rotating a magnetic field whose magnitude is $\pi/4$ radian. In this case, output voltages having the relationships shown in Table 9 are generated.

Figure 11:
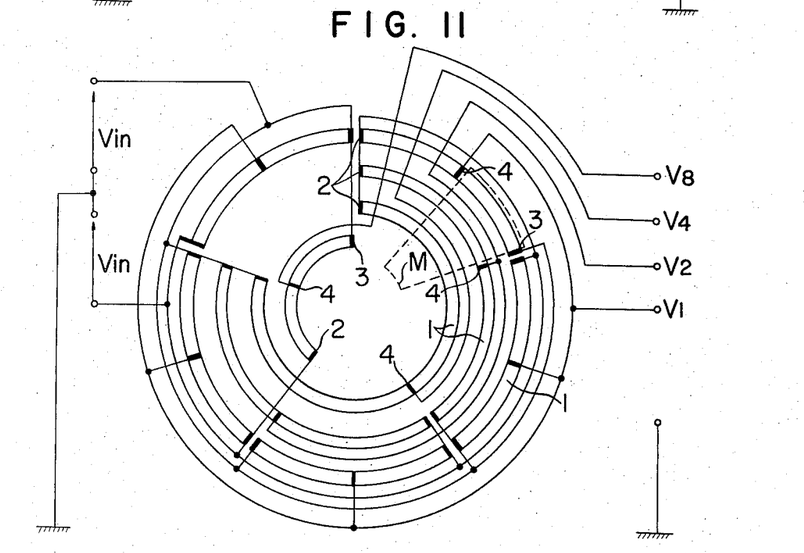

Furthermore, in an example of FIG. 11, there is shown a rotary switch with magneto resistive elements arranged circularly and multiplexly, in which an central angle viewing each element located on the second layer from the outermost side is chosen to be two times as much as a central angle viewing each element located on the outermost layer and an central angle viewing each element located on the third layer is chosen to be 4 times as much as a central angle viewing each element located on the outermost layer, and moreover all the elements are connected in parallel. In this case, output voltages $V_1$, $V_2$, $V_4$ and $V_8$ vary as shown in Table 8, whereby the embodiment can be utilized as an encorder to convert decimal angular position to binary signals.

Figure 13:
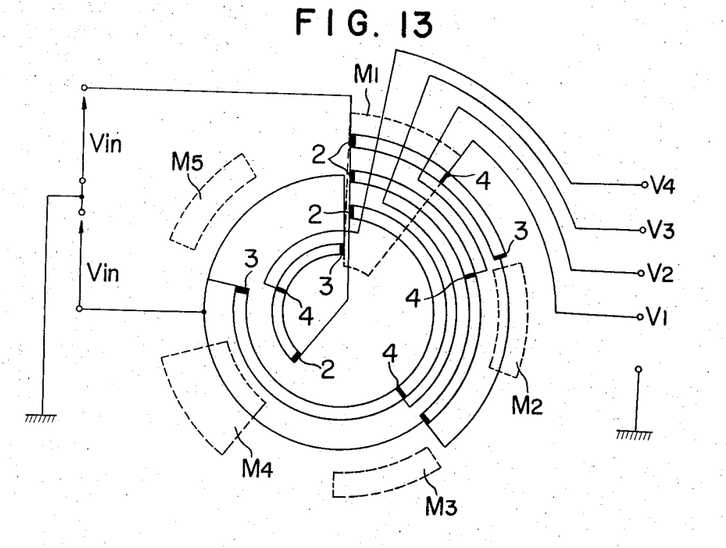

A binary signal generator of a rotary type can also be obtained in the construction of an embodiment shown in FIG. 13. This embodiment is such that a plurality of three-terminal magneto resistive elements in each layer provided in FIG. 11 are reduced into one three-terminal magneto resistive element for each layer, while the number of magnet pieces is increased to five and the thus increased magnet pieces $M_1$, $M_2$, $M_3$, $M_4$ and $M_5$ are arranged circularly at an equal interval, the shapes of the magnet pieces being indicated in FIG. 13. More precisely explaining, the shape of the embodiment, is made so that a first magnetic field $M_1$ affects three-terminal magneto resistive elements of from the first layer to the fourth layer, a fourth magnetic fields $M_4$ affects the three-terminal magneto resistive element of the first and second layers, and the second, third and fifth magnetic fields $M_2$, $M_3$ and $M_5$ affects the three-terminal magneto resistive element of only the first layer. All the magnetic fields $M_1$ through $M_5$ are linked so as to rotate as one unit. In this case also, output voltages as shown in Table 8 can be obtained as the voltages $V_1$, $V_2$, $V_4$ and $V_8$ of the output electrodes.

In addition, such a semiconductor device can be readily manufactured by the following steps that a thin plate or film of a semiconductor of high movility such as indium-antimonite, gariumarsenide, indium-arsenide phosphide, indium-arsenide, and the like is formed on a ferrite or any substrate, an unnecessary part (such as a part between columns) is removed by a photo-etching technique, and then metallic electrodes are formed thereon to have a desired pattern by a method of vacuum evaporation.

It is understood that, in examples as shown in FIG. 6 through FIG. 13, a plurality of three-terminal magneto resistive elements are not limited in number, shape and relative position thoseof, and can be altered in various ways within the scope of the invention as set forth in the appended claims.

Figure 14A:
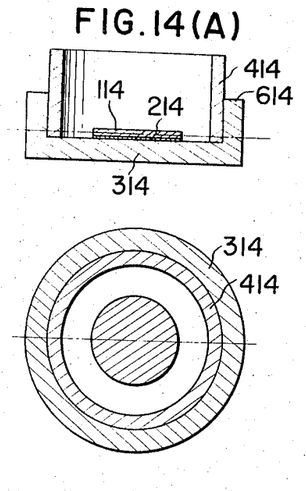
FIGS. 14a and 14b illustrate embodiments of the device adapted to apply at least one partial magnetic field to the magneto resistive element having three terminals.
Figure 14B:
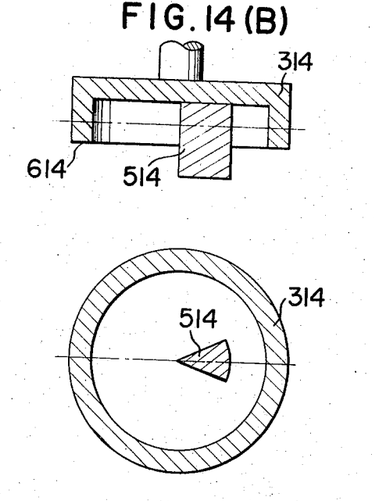

Shown in FIG. 14 is a rotary type example, wherein a partial magnetic field is applied to a semiconductor. In FIG. 14(A), a semiconductor 114 is secured through an insulator 214 in the central part of a magnetic substance 314 formed to be a disk having a protruding rim. On the other hand, in a structure shown in FIG. 14(B), a permanent magnet 514 having a desired sectional shape is secured on the central part of a disk-like magnetic substance having a protruding rim. When the structure shown in FIG. 14(B) is placed on the structure illustrated in FIG. 14(A) by utilizing a guide 414 so that both of them be aligned, the tip end of the permanent magnet 514 is positioned above the semiconductor 114, a slight air gap being present therebetween. The position of a magnetic field is varied by rotating the structure shown in FIG. 14(B). This construction has such advantages that no demagnetization is involved therein whereby the magnetic field strength can be permanently maintained therein.

Moreover, when "Teflon" seats are, as shown in FIG. 14, provided to each of end portions of the protruding rim of the disks, they are capable of rotating smoothly with each other.

Figures 15A, 15B:
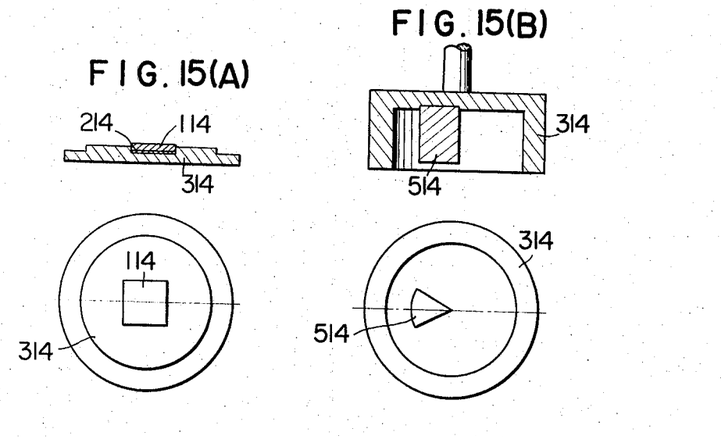
FIGS. 15a and 15b illustrate other embodiments of the device as shown in FIGS. 14a and 14b.

In FIG. 15(A) and (B), there is shown another rotary type example, wherein a partial magnetic field is applied to a semiconductor. A device shown in FIG. 15(A) and (B) is substantially equal to that shown in FIG. 14(A) and (B), except that the semiconductor 114 is secured through the insulator 214 in the hollow central part of the magnetic substance 314, and the latter 314 is not provided with a circular protruding rim.

Table 1

| Position of magnetic domain | (a) | (b) |
|---|---|---|
| 1 | $Vc_1 : +$ | $Vc_1 : +$ |
| 2 | $Vc_1 : -$ | $Vc_1 : -$ |
| 3 | $Vc_2 : +$ | $Vc_2 : -$ |
| 4 | $Vc_2 : -$ | $Vc_2 : +$ |
| 5 | $Vc_3 : +$ | $Vc_3 : +$ |
| 6 | $Vc_3 : -$ | $Vc_3 : -$ |
| . | . | . |
| . | . | . |
| $2n-1$ | $Vc_n : +$ | $Vc_n : +$ |
| $2n$ | $Vc_n : -$ | $Vc_n : -$ |

Table 2

In case that a magnetic field is $\pi/4$ radian in magnitude.

| Position of magnetic field Center (radian) | Output voltage | | | |
|---|---|---|---|---|
| | $V_1$ | $V_2$ | $V_3$ | $V_4$ |
| $\pi/8$ | − | 0 | 0 | 0 |
| $3\pi/8$ | + | 0 | 0 | 0 |
| $5\pi/8$ | 0 | − | 0 | 0 |
| $7\pi/8$ | 0 | + | 0 | 0 |
| $9\pi/8$ | 0 | 0 | − | 0 |
| $11\pi/8$ | 0 | 0 | + | 0 |
| $13\pi/8$ | 0 | 0 | 0 | − |
| $15\pi/8$ | 0 | 0 | 0 | + |

Table 3

In case that 4 magnetic fields each of which is $\pi/4$ radian in magnitude, are provided at an interval of $\pi/4$ radian.

| Position of magnetic field | Output voltage | | | |
|---|---|---|---|---|
| | $V_1$ | $V_2$ | $V_3$ | $V_4$ |
| Right | + | + | + | + |
| Left | − | − | − | − |

Table 4

In case that a magnetic field is $\pi/2$ radian in magnitude.

| Position of magnetic field Center (radian) | Output voltage | | | |
|---|---|---|---|---|
| | $V_1$ | $V_2$ | $V_3$ | $V_4$ |
| $\pi/2$ | + | − | 0 | 0 |
| $\pi$ | 0 | + | − | 0 |
| $3\pi/2$ | 0 | 0 | + | − |
| $2\pi$ | − | 0 | 0 | + |

Table 5

In case that two magnetic fields each of which is $\pi/2$ radian in magnitude, are opposed to each other.

| Position of magnetic field | Output voltage | | | |
|---|---|---|---|---|
| | $V_1$ | $V_2$ | $V_3$ | $V_4$ |
| $\pi/2$ | + | − | + | − |
| $\pi$ | − | + | − | + |

Table 6

| Position of one magnetic field (radian) Rotary type | Linear type | $V_1$ | $V_2$ | $V_3$ | $V_4$ |
|---|---|---|---|---|---|
| $0 - \pi/4$ | A | − | 0 | − | 0 |
| $\pi/4 - \pi/2$ | B | + | 0 | + | 0 |
| $\pi/2 - 3/2\pi$ | C | 0 | − | 0 | − |
| $(3/2)\pi - \pi$ | D | 0 | + | 0 | + |

Table 7

| Position of magnetic field Center (radian) | Output voltage | | | | | | | |
|---|---|---|---|---|---|---|---|---|
| | $V_1$ | $V_2$ | $V_3$ | $V_4$ | $V_{1a}$ | $V_{2a}$ | $V_{3a}$ | $V_{4a}$ |
| $\pi/8$ | − | 0 | 0 | 0 | − | 0 | 0 | 0 |
| $3\pi/8$ | + | 0 | 0 | 0 | + | 0 | 0 | 0 |
| $5\pi/8$ | 0 | − | 0 | 0 | 0 | − | 0 | 0 |
| $7\pi/8$ | 0 | + | 0 | 0 | 0 | + | 0 | 0 |
| $9\pi/8$ | 0 | 0 | − | 0 | 0 | 0 | − | 0 |
| $11\pi/8$ | 0 | 0 | + | 0 | 0 | 0 | + | 0 |
| $13\pi/8$ | 0 | 0 | 0 | − | 0 | 0 | 0 | − |
| $15\pi/8$ | 0 | 0 | 0 | + | 0 | 0 | 0 | + |

Table 8

| Indicating numeral | Position of magnetic field Center (radian) | Binary terminal output | | | |
|---|---|---|---|---|---|
| | | $V_1$ | $V_2$ | $V_4$ | $V_8$ |
| 0 | $\pi/10$ | − | − | − | 0 |
| 1 | $(3/10)\pi$ | + | − | − | 0 |
| 2 | $(5/10)\pi$ | − | + | − | 0 |
| 3 | $(7/10)\pi$ | + | + | − | 0 |
| 4 | $(9/10)\pi$ | − | − | + | 0 |
| 5 | $(11/10)\pi$ | + | − | + | 0 |
| 6 | $(13/10)\pi$ | − | + | + | − |
| 7 | $(15/10)\pi$ | + | + | + | − |
| 8 | $(17/10)\pi$ | − | − | − | + |
| 9 | $(19/10)\pi$ | + | 0 | 0 | + |

Table 9

| Position of magnetic field Center (radian) | Output voltage | | | |
|---|---|---|---|---|
| | $V_1$ | $V_2$ | $V_3$ | $V_4$ |
| 0 | − | 0 | 0 | − |
| $\pi/2$ | + | + | 0 | 0 |
| $\pi$ | 0 | − | − | 0 |
| $(3/2)\pi$ | 0 | 0 | + | + |

I claim:

1. A contactless device for detecting the position of a local magnetic field comprising:
   a. a magnetoresistive element;
   b. a pair of end electrodes disposed at opposite ends of said magnetoresistive element and a central electrode disposed on said magnetoresistive element midway between said end electrodes;
   c. means for developing a local magnetic field having an extent less than a distance between said central electrode and one of said end electrodes, said means for developing a local magnetic field comprising means for applying said local magnetic field to either areas of said magnetoresistive element defined between said central electrode and said end electrodes respectively;
   d. a ground electrode;
   e. means for applying each of a pair of voltages between said ground electrode and a respective one of said end electrodes, said pair of voltages being applied in use and having equal magnitudes and opposite polarities; and
   f. output means for providing an output voltage developed in use between said central electrode and said ground electrode, said output voltage being representative of a position of said local magnetic field relative to said magnetoresistive element.

2. A contactless device for detecting the position of a local magnetic field according to claim 1 wherein said means for developing a local magnetic field comprises an orthoferrite substrate disposed adjacent said magnetoresistive element, said orthoferrite substrate having at least one magnetic bubble domain therein.

3. A contactless device for detecting the position of a local magnetic field according to claim 1 wherein said means for developing a local magnetic field comprises means defining a magnetic circuit having a portion thereof adjacent said magneto-resistive element and moveable relative thereto.

4. A contactless device for detecting the position of a local magnetic field according to claim 1 including a plurality of magnetoresistive elements arranged in at least one straight line wherein respective end electrodes disposed on said magneto-resistive elements are electrically connected in parallel.

5. A contactless device for detecting the position of a local magnetic field according to claim 1 including a plurality of magnetoresistive elements disposed along a first straight line and disposed along a second straight line perpendicular to said first straight line whereby the position of said local magnetic field may be detected along two perpendicular dimensions.

6. A contactless device for detecting the position of a local magnetic field according to claim 1 including a plurality of magnetoresistive elements disposed in a concentric circular pattern wherein respective end electrodes disposed on said magnetoresistive elements are electrically connected in parallel.

7. A contactless device for detecting the position of a local magnetic field comprising detection means for developing a trinary bipolar digital output signal representative of a position of the detected local magnetic field, said detection means comprising:
  a. a magnetoresistive element;
  b. a pair of end electrodes disposed at opposite ends of said magnetoresistive element and a central electrode disposed on said magnetoresistive element midway between said end electrodes;
  c. means for developing a local magnetic field having an extent less than a distance between said central electrode and one of said end electrodes, said means for developing a local magnetic field comprising means for applying said local magnetic field to either of areas of said magnetoresistive element defined between said central electrode and said end electrodes respectively;
  d. a ground electrode;
  e. means for applying each of a pair of voltages between said ground electrode and a respective one of said end electrodes, said pair of voltages being applied in use and having equal magnitudes and opposite polarities; and
  f. output means for providing an output voltage developed in use between said central electrode and said ground electrode, said output voltage having a first polarity when said local magnetic field is applied to said magnetoresistive element between said central electrode and a first of said end electrodes, said output voltage having a second polarity when said local magnetic field is applied to said magnetoresistive element between said central electrode and the second of said end electrodes, and said output voltage having zero magnitude when no local magnetic field is applied to said magnetoresistive element.

8. A method for developing a voltage signal representative of a position of a local magnetic field comprising:

a. providing a magnetoresistive element having a pair of end electrodes disposed at opposite ends thereof and a central electrode disposed midway between said end electrodes;
  b. applying a pair of voltages having equal magnitude and opposite sign between ground and respective ones of said end electrodes;
  c. moving said magnetoresistive element relative to a local magnetic field the position of which is to be detected while said pair of voltages are applied to said end electrodes, said local magnetic field having an extent less than a distance between said central electrodes and said end electrodes, and
  d. detecting an electrical output voltage signal developed between said central electrode and ground, said output voltage having a first polarity when said local magnetic field is adjacent said magnetoresistive element between a first of said end electrodes and said central electrode and said output voltage having a second polarity when said local magnetic field is adjacent said magnetoresistive element between the other of said end electrodes and said central electrode.

* * * * *